US006145210A

United States Patent [19]

Walczynski

[11] Patent Number: 6,145,210

[45] Date of Patent: Nov. 14, 2000

[54] ACCESSORIZED COLLAPSIBLE MULTISCALE

[76] Inventor: Chris Walczynski, 1720 W. Grandview Dr., McHenry, Ill. 60050

[21] Appl. No.: 09/148,809

[22] Filed: Sep. 4, 1998

[51] Int. Cl.[7] .................................. G01B 3/06; B43L 7/10

[52] U.S. Cl. .................................. 33/458; 33/456; 33/484; 33/492

[58] Field of Search .............................. 33/478, 483, 484, 33/485, 489, 491, 492, 493, 494, 495, 452, 456, 458

[56] References Cited

U.S. PATENT DOCUMENTS

| | | | |
|---|---|---|---|
| 146,673 | 1/1874 | Haslett | 33/483 |
| 564,204 | 7/1896 | Leeds | 33/483 |
| 569,358 | 10/1896 | Sommerfeldt | 33/491 |
| 1,227,614 | 5/1917 | Hauptman | 33/485 |
| 1,383,140 | 6/1921 | Naterman | 33/485 |
| 3,845,563 | 11/1974 | Taniquchi | 33/491 |
| 5,531,028 | 7/1996 | Flippen | 33/493 |
| 5,713,551 | 2/1998 | Doerner | 33/485 |

*Primary Examiner*—Christopher W. Fulton
*Attorney, Agent, or Firm*—Kajane McManus

[57] ABSTRACT

The accessorized collapsible multiscale comprises a plurality of elongate slats which are joined together along elongate edges thereof, each slat including at least one graduated scale thereon, the multiscale being collapsible by folding together of adjacent slats, and the multiscale including an accessory clip which is used to maintain a terminal position of a desired slat, with the clip angling the slat relative to a support surface therefor for ease in viewing the scale on the desired slat.

14 Claims, 2 Drawing Sheets

FIG. 5
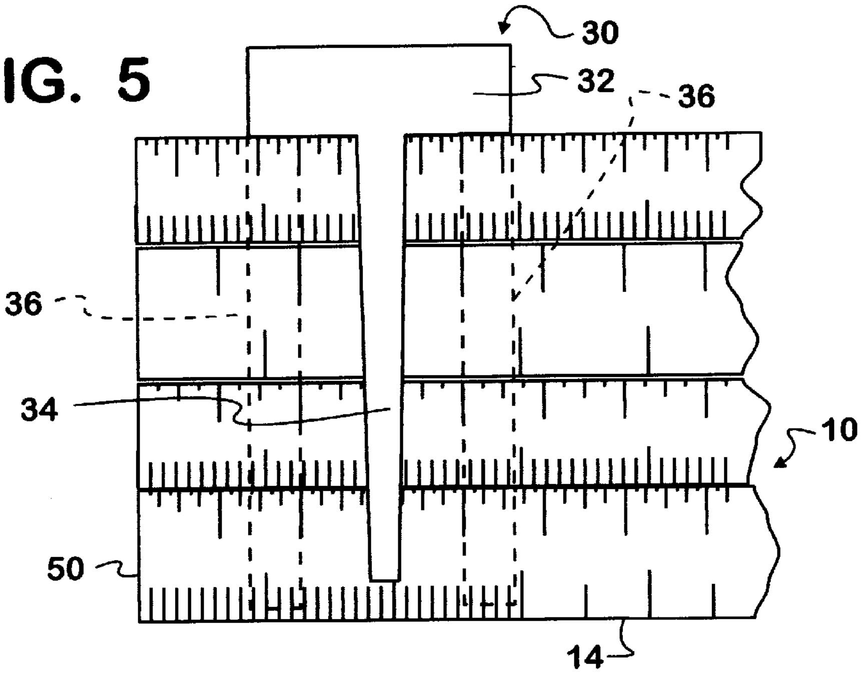
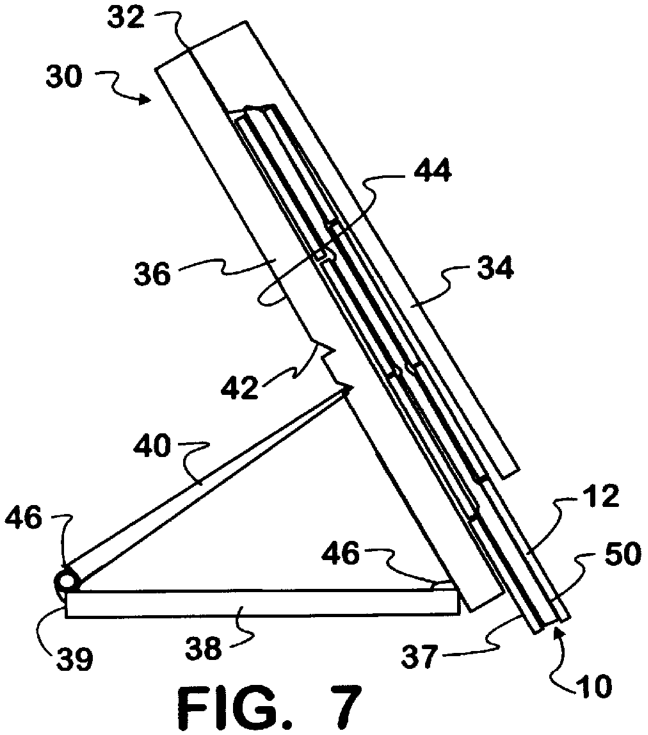
FIG. 7
FIG. 6
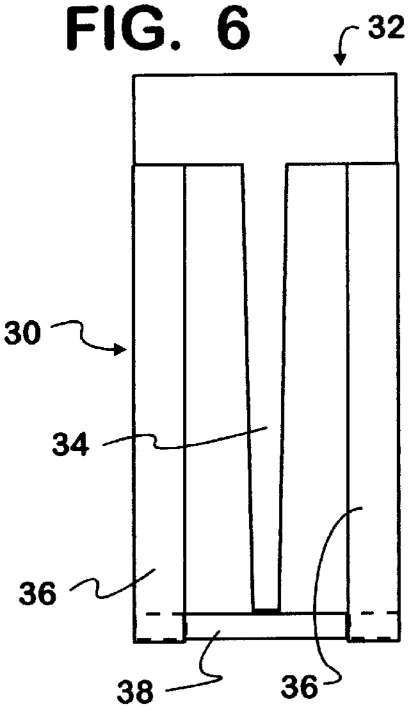
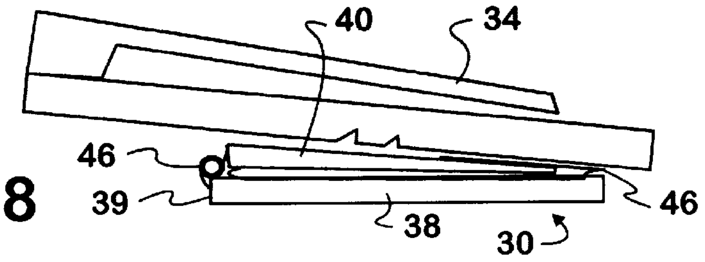
FIG. 8

ACCESSORIZED COLLAPSIBLE MULTISCALE

BACKGROUND OF THE INVENTION

1. Field of the Invention

The present invention relates to scales, such as those used by draftsmen and engineers, in, as an example, preparation and perusal of drawings requiring accuracy of measurements of item(s) illustrated in the drawings. More particularly, the invention relates to a structure that is compact, provides an unlimited number of scales thereon, incorporating some scales not presently available, and which includes an accessory for isolating a particular scale selected for use from other available scales.

2. Prior Art

Heretofore, various forms of scales for use in creating hand drawings have been proposed. Such scales have also incorporated more than one set of graduations thereon. However, each such scale has typically been restricted to providing a particular class of graduations thereon, such as providing only commonly used engineering scale graduations, commonly used architectural scale graduations, etc. Further, certain graduated scales have heretofore been impossible to find, such as an English scale having odd numbered increments over thirds, such as fifths, (i.e, 5/32, 5/16, 5/8, etc.), sevenths, ninths, etc., as well as certain unavailable metric scales. Still further, the scale embodiments presently available are of substantial size and, with several often being necessary for use in a single project, produce a cumbersome load which is not simply transportable, such as within a shirt pocket.

SUMMARY OF THE INVENTION

Accordingly, it is a primary object of the invention to provide a multiscale which incorporates a multiplicity of desired graduated scales thereon, including those previously not available, with the structure being collapsible into a small, easily transported package.

A further object is to provide an accessory for the multiscale which is used to isolate a desired scale (or group of scales) from others available, and to align the desired scale(s) relative to a supporting surface or workpiece at a position which allows for ease in viewing of the desired scale(s), or of an adjacent scale(s), without the necessity of any great degree of manipulation or displacement from a desired orientation.

These and other objects are met by the accessorized collapsible multiscale of the present invention, the multiscale comprising a plurality of elongate slats having one or more graduated scales on each slat, the slats being joined together along longer edges thereof in a hinged manner, the slats being fanfoldable relative to each other and being extendable to place a desired slat at a terminal position relative to the other slats, with the multiscale being engageable by a clip which maintains the terminal position of the desired slat while placing the slat at a preselected angle relative to the supporting surface for ease in viewing of same, the clip being engageable to at least one slat when the slats are fanfolded, as a take-with accessory.

BRIEF DESCRIPTION OF THE DRAWINGS

FIG. 5 is a perspective view of a portion of the multiscale showing slats thereof linearly aligned and engaged by an accessory clip which maintains terminal positioning of a desired slat as well as placing the slat at a desired angle relative to a supporting surface for ease in viewing of a graduated scale thereon.

FIG. 6 is a perspective view of the clip of FIG. 5.

FIG. 7 is a side view of the clip showing same in a position of use wherein the multiscale is held at a desired angle to the supporting surface.

FIG. 8 is a side view of the clip showing same folded flat for transport.

DESCRIPTION OF THE PREFERRED EMBODIMENT

Figure 1:
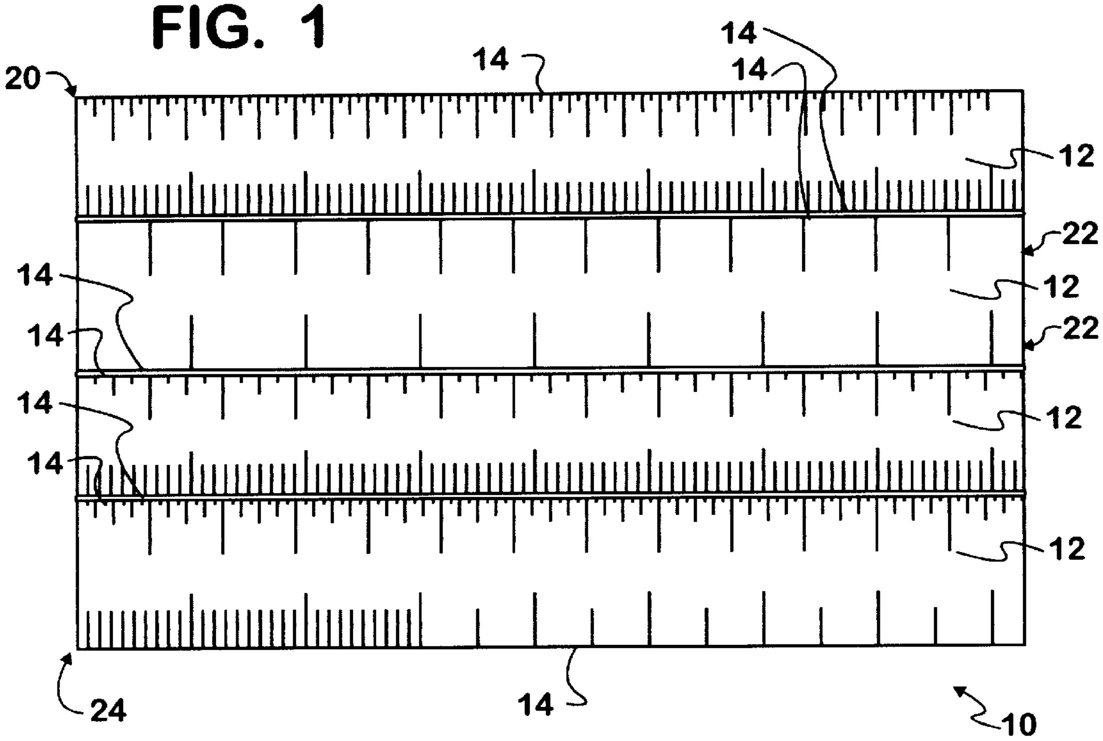
FIG. 1 is a perspective view of a portion of the collapsible multiscale of the present invention, the portion being visible when joined slats of the multiscale are laid out flat.

Referring now to FIGS. 1–4 in greater detail there is illustrated therein a collapsible multiscale made in accordance with the teachings of the present invention and generally identified by the reference numeral 10.

As illustrated, the multiscale 10 is comprised of a series of elongate slats or rules 12 joined together along elongate side edges 14 thereof, in a manner allowing flexibility between the slats 12.

Figure 2:
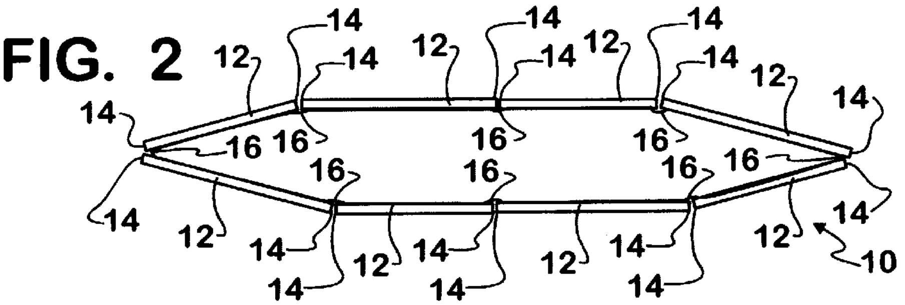
FIG. 2 is an end view of the multiscale showing same to be comprised of an even number of slats, each of which is hingedly engaged to adjacent slats in a manner forming a closed circle.
Figure 4:
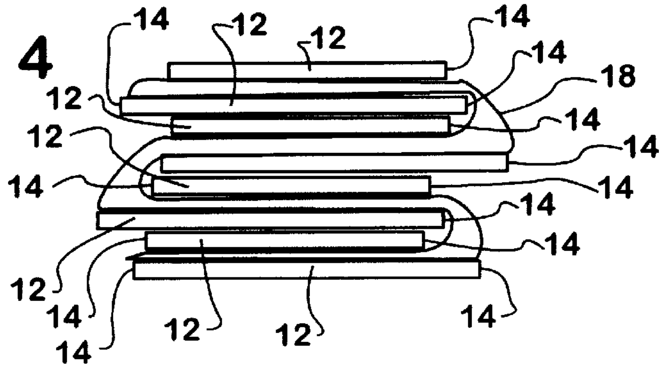
FIG. 4 is an end view showing the slats compactly fanfolded for transport.

Such flexibility may be produced through use of living hinges 16, as shown in FIG. 2, or by engaging the slats 12 upon a flexible backing 18, as shown best in FIG. 4.

Inasmuch as the multiscale 10 is designed to incorporate a substantial number of, if not at all, scales which could possibly be desired, it will be understood that any desired number of slats 12 could be incorporated into the multiscale 10, the eight slats 12 being illustrated as an example and not to be construed as limiting. Also, it will be understood that there is no restriction, within reason, on the length of the multiscale, so long as it is conductive to portability, although, a length of six inches has been found suitable for a pocket version of the multiscale and a twelve inch version has been found easily accommodated by a briefcase.

Still further, to allow for accommodation of any desired number of scales, such scales may be laid out along the elongate side edges 14 of the slats 12 in a number of ways.

For example, a first scale as shown at 20 could allow for integration of multiple levels of graduation thereon, by varying the length of interposed lines of indicia 21 so that each line length corresponds to a particular level of graduation, as shown, the number of levels only being limited by the distance available between the graduations to provide clarity of view.

Further, a single scale as shown at 22 could be laid out along an entire elongate edge 14.

Still further, a plurality of scales, as shown at 24, may be placed independently and contiguorisly along an elongate edge 14.

With both elongate edges 14 of each slat 12 being useable, and with incorporation of a potentially unlimited number of slats 12, it will be seen that the number of graduated scales which can be presented with the multiscale 10 is also virtually limitless.

Also, it will be understood that it is not necessary for both elongate edges 14 of each slat 12 to incorporate a scale thereon.

Figure 3:
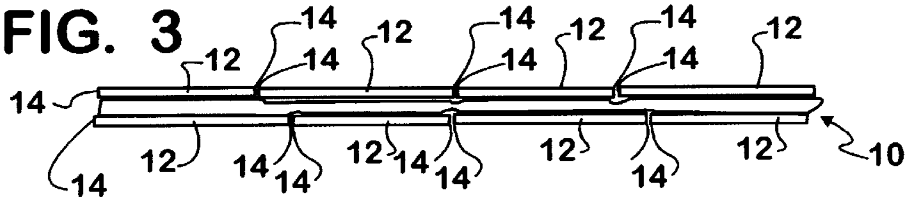
FIG. 3 is an end view showing the slats to form a double layer when the slats are arranged as shown in FIG. 1.

FIGS. 2–4 depict the multiscale 10 to be a continuous structure and, although this is the preferred embodiment, it should not be construed as limiting.

However, when the multiscale 10 is embodied as continuous, as best shown in FIG. 4, it is preferred to provide adjacent slats 12 of a varied width, such variation in width easing fanfolding. If the multiscale 10 were configured as noncontinuous, such varied width for adjacent slats would not be necessitated with the slat 12 being arranged in a single, rather than double layer to be folded.

Turning now to FIGS. 5–8, it will be seen that the multiscale 10 is suited for use with an accessory 30 which serves as both a clip and stand for the multiscale 10.

In this respect, the accessory 30 comprises a three prong clip 32, a center prong 34 of which is flexible and clamps the multiscale 10 against two side prongs 36 of the clip 32 which, as illustrated in phantom in FIG. 5, are located against a rear or nonvisible surface 37 of the multiscale 10. This configuration allows for a slat 12 incorporating a desired scale to be positioned terminally, relative to the remaining slats 12, without interfering with the view of the desired scales. Further, although not required, the accessory 30 may be made of a transparent material such as plastic, to allow for viewing of all areas of all scales on slats 12 visible to a user.

To allow for positioning of the multiscale 10 at an angle which eases viewing thereof when placed upon a support surface (not shown), the clip 32 has a rearwardly extendable leg 38 from a free end 39 of which a positioning arm 40 can be angularly extended to engage within a cooperating slot 42 in a rear surface 44 of the side prongs 36 of the clip 32.

It is proposed to join the leg 38 to the side prongs 36 and to the arm 40 by biasing hinges 46, which, when the arm 40 is disengaged from the slot 42, cause the arm 40 to flex against the rear surface 44 of the side prongs 36, sandwiching the arm 40 between the leg 38 and the prongs 36, to create a compact accessory 30.

Although not illustrated, it will be understood that the clip 32 may be engaged to at least one slat 12 of the multiscale 10 for storage, by engaging the prongs 36 about a narrow edge 50 of one or more slats 12 when the slats 12 are folded for storage.

As described above the accessorized multiscale 10 of the present invention provides a number of advantages, some of which have been descried above and others of which are inherent in the invention. Also, modifications may be proposed to the accessorized multiscale 10 without departing from the teachings herein. Accordingly, the scope of the invention is only to be limited as necessitated by the accompanying claims.

I claim:

1. An accessorized collapsible multiscale comprising a plurality of elongate slats, each slat being flexibly joined to an adjacent slat along each elongate side edge thereof, the multiscale being collapsible by folding adjacent slats together, with each slat including at least one graduated scale thereon.

2. The multiscale of claim 1 wherein a plurality of graduated scales are included on a slat.

3. The multiscale of claim 1 wherein the slats are joined together by living hinges.

4. The multiscale of claim 1 wherein the slats are fixed to a continuous flexible backing.

5. The multiscale of claim 1 wherein the slats are equal in length.

6. The multiscale of claim 5 wherein the length is any desired length conducive to portability.

7. The multiscale of claim 1 further including an accessory comprising a clip.

8. The multiscale of claim 7 wherein said clip comprises a flexible center prong positioned between two side prongs.

9. The multiscale of claim 8 wherein said clip further includes an extendable leg hingedly engaged to said side prongs.

10. The multiscale of claim 9 wherein said clip further includes an extendable arm pivotably engaged to a free end of said leg.

11. The multiscale of claim 10 wherein a free end of said arm engages within a cooperating slot on a rear surface of said side prongs.

12. The multiscale of claim 11 wherein said hinges are biased, with the arm folding against said leg when the free end is disengaged from the slots.

13. The multiscale of claim 12 wherein said leg is biased to fold against the rear surface of said side prongs, with the arm being positioned between the leg and the rear surface of the side prongs.

14. The multiscale of claim 13 wherein said clip is engageable to a narrow edge of a slat for storage.

* * * * *